United States Patent
Liu et al.

(10) Patent No.: US 6,940,861 B2
(45) Date of Patent: Sep. 6, 2005

(54) DATA RATE LIMITING

(75) Inventors: Zhao Liu, Tewksbury, MA (US); Jerry Zhiyi Guo, Carlisle, MA (US)

(73) Assignee: General Instrument Corporation, Horsham, PA (US)

( * ) Notice: Subject to any disclaimer, the term of this patent is extended or adjusted under 35 U.S.C. 154(b) by 893 days.

(21) Appl. No.: 09/804,857

(22) Filed: Mar. 13, 2001

(65) Prior Publication Data

US 2001/0024452 A1 Sep. 27, 2001

Related U.S. Application Data

(60) Provisional application No. 60/189,640, filed on Mar. 14, 2000.

(51) Int. Cl.[7] .............................................. H04L 12/56
(52) U.S. Cl. .................................. 370/395.21; 709/104
(58) Field of Search ................................ 370/229, 235, 370/395.1, 396, 395.21, 395.4, 395.41, 395.43, 360, 395.3, 429, 462; 709/104, 229

(56) References Cited

U.S. PATENT DOCUMENTS

| | | | | |
|---|---|---|---|---|
| 5,463,620 A | * | 10/1995 | Sriram | 370/412 |
| 6,067,301 A | * | 5/2000 | Aatresh | 370/418 |
| 6,452,933 B1 | * | 9/2002 | Duffield et al. | 370/415 |

FOREIGN PATENT DOCUMENTS

| | | |
|---|---|---|
| EP | 0901301 A2 | 10/1999 |
| EP | 0977405 A1 | 2/2000 |

OTHER PUBLICATIONS

Altintas et al., A Note on Fair Queueing and Best–Effort Service in the Internet, IEEE 0–7803–9939–0/99, 1999.
Notification of Transmittal of The International Search Report or the Declaration, mailed Nov. 19, 2001.

* cited by examiner

*Primary Examiner*—Wellington Chin
*Assistant Examiner*—Brenda Pham
(74) *Attorney, Agent, or Firm*—Esteban A. Rockett (57) ABSTRACT

A packetized-data processing apparatus includes a memory configured to store core groups of packetized data, a channel coupled to the memory and having a total bandwidth for transferring packets of data from the core groups, and a scheduler operatively coupled to the memory and the channel and configured to allocate amounts of the total bandwidth of the channel to each of the core groups that is backlogged, while limiting the amount of allocated bandwidth, and a corresponding transfer rate of packets of data, for each core group to a maximum allowable bandwidth for each core group, to schedule transfer of packetized data of the core groups from the memory to the channel in accordance with the respective amounts of allocated bandwidth for the core groups.

21 Claims, 5 Drawing Sheets

DATA RATE LIMITING

CROSS-REFERENCE TO RELATED APPLICATIONS

This application claims the benefit of U.S. Provisional Application No. 60/189,640 entitled "Data Rate Limiting," filed Mar. 14, 2000.

BACKGROUND OF THE INVENTION

The invention relates to communications and more particularly to scheduling of packet flow in packet-based networks.

Figure 1:
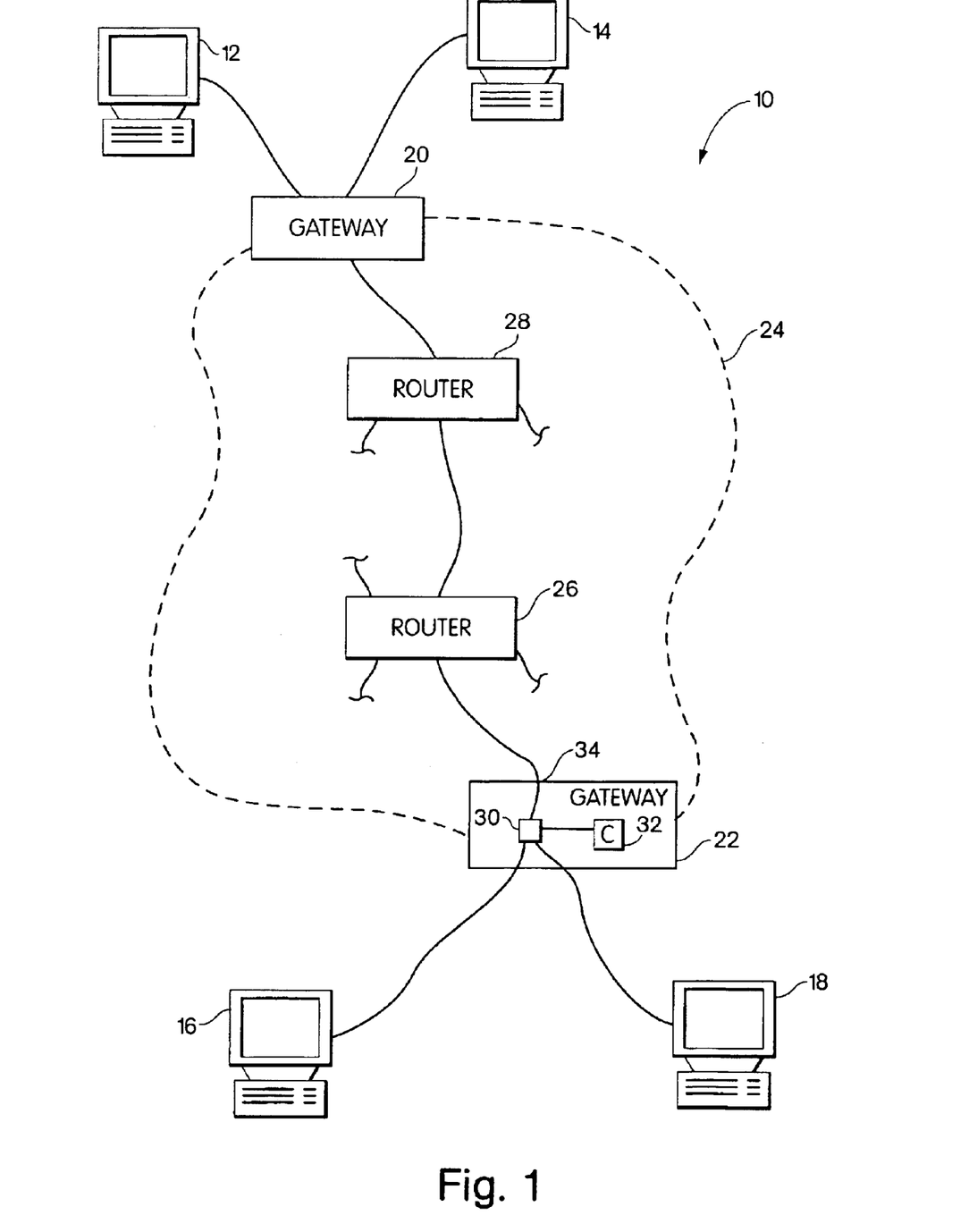
FIG. 1 is a simplified diagram of a communication system according to an embodiment of the invention.

Data are transferred over packet-based networks in packets and sequences of packets. These packets and sequences of packets are grouped as flows (queues; "queues" and "flows" are used interchangeably below). These queues have associated traffic characteristics (e.g., source, destination, and protocol) related to their transfer through a network. According to the traffic characteristics, resources can be allocated to the queues to help to use available resources efficiently and transfer data in a timely manner. An exemplary flow is a sequence of packets carrying File Transfer Protocol (FTP) data traffic from an originating computer to a destination computer across a network, e.g., a packet-based network 24 (FIG. 1). Another exemplary flow is a sequence of packets carrying real time voice traffic from an originating device to a destination device across a packet network, e.g., the network 24 (FIG. 1).

More resources, and/or better use of resources, for transferring data through packet-based networks are needed as more people use packet-based networks, such as the Internet, to transmit increasing amounts of data with different traffic characteristics. Packet-based networks are increasingly popular and are used to communicate more data every day. For example, the Internet is a packet-based network accessed by millions every day, e.g., to view world-wide-web pages and to send and receive email. Email already outnumbers traditional mail by approximately 10 to 1, and this ratio is expected to increase. As more data are transferred and technology progresses, people expect packet-based networks to handle the increased data traffic, to transmit the data faster, and to handle different types of services such as Voice Over Internet Protocol (VoIP) or IP telephony.

SUMMARY OF THE INVENTION

Embodiments of the invention provide techniques for hierarchical scheduling of queues in a packet-based network while providing per-flow rate limiting. A scheduler can adapt to changing resource needs and availability to allocate the resources to queues of data packets and also to limit the use of resources by queues, especially in accordance with maximum bandwidth characteristics of queues to provide rate-limiting features.

In general, in one aspect, the invention provides a packetized-data processing apparatus including a memory configured to store core groups of packetized data, a channel coupled to the memory and having a total bandwidth for transferring packets of data from the core groups, and a scheduler operatively coupled to the memory and the channel and configured to allocate amounts of the total bandwidth of the channel to each of the core groups that is backlogged, while limiting the amount of allocated bandwidth, and a corresponding transfer rate of packets of data, for each core group to a maximum allowable bandwidth for each core group, to schedule transfer of packetized data of the core groups from the memory to the channel in accordance with the respective amounts of allocated bandwidth for the core groups.

Implementations of the invention may include one or more of the following features. The the scheduler is configured to allocate channel bandwidth to a dummy group. The channel bandwidth allocated to the dummy group is dependent upon an amount of backlogged core groups. The dummy group is allocated zero bandwidth if all core groups are backlogged. The channel bandwidth allocated to the dummy group is also dependent upon weightings of bandwidth allocation associated with the core groups and upon at least one maximum allowable bandwidth associated with at least one of the core groups. The dummy group is allocated zero bandwidth if the total channel bandwidth is allocatable to only core backlogged groups in accordance with their relative bandwidth weightings without exceeding their respective maximum allowable bandwidths. The dummy group is allocated at least an amount of the total channel bandwidth equaling a sum of the respective maximum allowable bandwidths of backlogged core groups. The dummy group is allocated bandwidth according to $Q(B_{total}/B_{max}-M')$, where $B_{total}$ is the total channel bandwidth, $B_{max}$ is the maximum allowable bandwidth for each of the core groups, M' is the amount of backlogged core groups, and Q is a weighting of core groups. The scheduler is configured to determine an amount of bandwidth to allocate to the dummy group each time a backlog state of a core group changes.

The core groups may be classes of queues of packets of data or queues of packets of data.

In general, in another aspect, the invention provides a computer program product, for use with a communications channel having a total bandwidth and a memory for storing core groups of packets of data, the computer program product comprising instructions for causing a computer to: obtain an indication of an amount of backlogged core groups, allocate first portions of the total bandwidth of the channel to a plurality of backlogged core groups according to weights associated with each backlogged core group, and allocate a second portion of the total bandwidth of the channel to a dummy group, the second portion being at least as large as an amount of the total bandwidth that exceeds a cumulative bandwidth of maximum bandwidths associated with the plurality of backlogged core groups.

Implementations of the invention may include one or more of the following features. The instructions for causing a computer to allocate bandwidth cause the computer to allocate bandwidth in response to a core group changing backlogged state. The second portion is zero bandwidth if the total channel bandwidth is allocatable to only core backlogged groups in accordance with their relative bandwidth weights without exceeding respective maximum allowable bandwidths of the core backlogged groups. The second portion is dependent upon at least one maximum allowable bandwidth associated with at least one of the core groups. The second portion is $Q(B_{total}/B_{max}-M')$, where $B_{total}$ is the total channel bandwidth, $B_{max}$ is a maximum allowable bandwidth for each of the core groups, M' is an amount of backlogged core groups, and Q is a weighting of core groups.

In general, in another aspect, the invention provides a method of transferring data packets from a plurality of groups for storing packets of data and a transmission channel having a total bandwidth, the method including obtaining an indication of an amount of backlogged groups from among the plurality of groups, allocating first portions of the total bandwidth of the channel to a plurality of backlogged groups according to weights associated with each backlogged group, and allocating a second portion of the total bandwidth of the channel to be unused, the second portion being at least as large as an amount of the total bandwidth that exceeds a cumulative bandwidth of maximum bandwidths associated with the plurality of backlogged groups.

Implementations of the invention may include one or more of the following features. The method of claim 17 wherein the allocating of the first portions and the second portion occur in response to a group changing backlogged state. The second portion is zero bandwidth if the total channel bandwidth is allocatable to only backlogged groups in accordance with their relative bandwidth weights without exceeding respective maximum allowable bandwidths of the backlogged groups. The second portion is dependent upon at least one maximum allowable bandwidth associated with at least one of the groups. The second portion is $Q(B_{total}/B_{max}-M')$, where $B_{total}$ is the total channel bandwidth, $B_{max}$ is a maximum allowable bandwidth for each of the groups, M' is an amount of backlogged groups, and Q is a weighting of groups.

In general, in another aspect, the invention provides a system for transferring packets of data, the system including at least one input port configured to receive packets of data, a storage device coupled to the at least one input port and configured to store groups of packets of data received at the at least one input port, at least one output port coupled to the storage device and configured to transmit packets of data stored in the storage device, and control means for controlling amounts of bandwidth of the output port provided for each of the groups for transferring the packets of data via the output port, the amount of bandwidth provided for each group varying with a number of groups containing packets of data and being limited to a maximum amount of bandwidth associated with each group.

Implementations of the invention may include one or more of the following features. The control means controls the amounts of bandwidths for each group by applying a weighted deficit round robin algorithm. The weighted deficit round robin algorithm includes a dummy for which the control means provides bandwidth to limit rates at which packets of data are transferred from the groups.

Various embodiments of the invention may provide one or more of the following advantages. Packet queues can be scheduled and rate limited. Rate limiting and scheduling of queues can be provided in a single unified data structure and with less processing power than previously required. Undesired data bursts can be guarded against.

These and other advantages, and the invention itself, will be more apparent from the following figures, description, and claims.

DETAILED DESCRIPTION OF PREFERRED EMBODIMENTS

Referring to FIG. 1, a system 10 includes several computers 12, 14, 16, 18, connected to gateways 20, 22, respectively, of a packet-based network 24, such as the Internet, that are connected routers 26, 28 in the network 24 that are connected to each other. Functions of the invention described below can be implemented using hardware, software (e.g., executed by one or more processors), firmware, or combinations of any of these, which can be located at various locations throughout the system 10, and preferably in the gateways 20, 22 or the routers 26, 28. For example, the rate-limiting deficit round robin scheduler described below can be physically located in the gateways 20, 22, and/or the routers 26, 28, and/or any other location in the system 10 where it is desired to prioritize data flow from queues and/or classes of queues.

Elements of the system 10 are configured to produce, transfer, encode/decode, and/or otherwise process packets of data. Computers 12, 14, 16, 18 can produce packets of data representing, e.g., emails, voice, audio, video, and/or web browsing commands, or can produce data in non-packet form. The gateways 20, 22 are configured to receive data at input ports connected to the computers 12, 14, 16, 18 and to convert these data as appropriate into acceptable formats for transfer from output ports of the gateways 20, 22 through the network 24, e.g., through routers 26, 28. Both the gateways 20, 22 and the routers 26, 28 may receive multiple packets from multiple sources and can have multiple flows being transferred through them from input port to output port at any given time. Output ports, or channels, for transferring packets of data have a limited data transfer capacity, or bandwidth. The amount of bandwidth resources available in the gateways 20, 22 and/or routers 26, 28 is typically allocated to the multiple flows, e.g., to help accommodate situations where the available resources are exceeded by the resources ideally available for the flows.

The gateways 20, 22 and routers 26, 28 have memories for storing packets of data and controllers for regulating data transfer. For example, the gateway 22 has a memory 30 for storing packets of data that arrive from the computers 16, 18. The memory 30 is, e.g., a buffer that is configured for short-term storage and rapid storage and retrieval of data. Transfer of the data stored in the memory 30 is controlled by a controller 32 that is coupled to the memory 30. The controller regulates data flow, allocating bandwidth of an output port or channel 34 of the gateway 22 to various queues of packets or classes of queues, or other groups of packets of data. The bandwidth allocated to the groups can be determined in a variety of manners, such as by employing a weighted deficit round robin algorithm in the controller 32.

The following description focuses on scheduling queues in a class of queues. Similar techniques can be applied to multiple classes of queues, hierarchical queuing, and scheduling (including multiple levels of class and subclass) and these techniques are within the scope and spirit of the invention. Bandwidth resources are allocated differently according to weights of classes of queues. Within a class, individual queues are allocated the same bandwidth resources (assuming equal weighting of queues, or non-weighted queues). To guard against queues receiving too much bandwidth, a dummy queue is allocated some bandwidth resources dependent on maximum bandwidths for queues in the dummy queue's class, the bandwidth allocated to the class, the number of queues in the class, and the weight Q given to queues within the class. The following discussion assumes equal weight (constant Q) equal to 1 for all queues in a given class, although the invention, including the appended claims, encompasses unequal weights of queues or other groups of data packets.

Embodiments of the invention provide rate-limiting functionality with a hierarchical Deficit Round Robin (DRR) scheduler. Using an algorithm, named Rate-Limiting DRR (RLDRR), both per-flow rate limiting and scheduling functionality are provided with a unified per-flow queuing data structure. This structure can be scaled to handle a large number of per-flow queues with limited processor power or less implementation complexity. Embodiments of the invention provide rate limiting and scheduling without separate shaping data structures and with reduced processor power compared to prior techniques.

Figure 2:
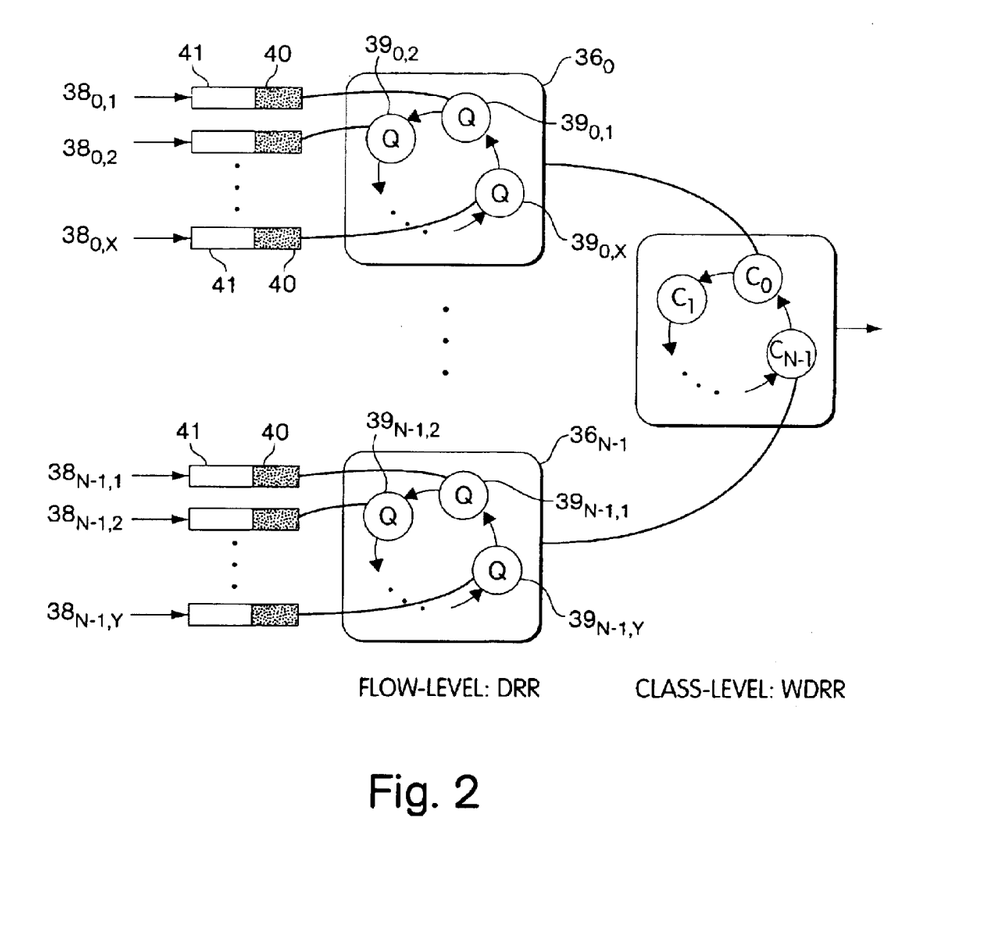
FIG. 2 is a schematic block diagram of prior art hierarchical data scheduling of flows in a packet-based network.

The Deficit Round Robin algorithm (DRR) has been widely used in packet-based traffic scheduling for its fairness and implementation simplicity. One application of the DRR algorithm for supporting per-flow queuing and scheduling among flows with different bandwidth requirements is to form a hierarchical queuing and scheduling scheme as shown in FIG. 2. For this figure, and those below, it is assumed that the scheduling, and other processing of packets discussed, occurs in gateway 22.

In the hierarchical queuing and scheduling scheme as shown in FIG. 2 queues are grouped by the gateway 20 into N classes, labeled $36_0$–$36_{N-1}$. Although as shown weighted DRR is applied at the class level, and DRR at the flow level, other arrangements, including applying weighted DRR at the flow level are possible. For each class, all the per-flow queues, e.g., queues $38_{1,1}$–$38_{1,x}$ of data packets 40, and empty queue portions 41, are assumed to have the same traffic characteristics, and queues $38_{N-1,1}$–$38_{N-1,y}$, of data packets 40 are assumed to have the same traffic characteristics (although this need not be the case). For example, all the flows 38 within the class $36_1$ are assumed to have the same quantum 39, the same minimum bandwidth requirement, the same latency requirement, and the same maximum bandwidth requirement (rate limiting requirement). As shown, classes $36_1$ and $36_{N-1}$ have different numbers (x for class $36_1$ and y for class $36_{N-1}$) of queues 38. Each class 36 can have a unique number of queues 38, and can have empty queues 38.

Classes 36 are scheduled by the controller 32 using the DRR algorithm with a quantum (or weight) for each class 36 to partition a total channel bandwidth $B_c$, that is available for transferring data from all the queues 38. This partitions the channel into N "sub-channels" or classes according to bandwidth provisioning to each "sub-channel" or class. If the DRR quantum (or weight) provisioned to class i is $C_i$ (i=0, 1, . . . , N–1), then each sub-channel (or class) has a fraction of the total bandwidth B as specified by:

$$B_i = \frac{c_i}{\sum_N c_i} \times B \quad (1)$$

Among all the flows or queues 38 associated with a class 36, DRR scheduling with equal quantum (or weight) is used (because equal weighting is assumed, but is not required). Thus the bandwidth provisioned to the class $36_1$ is equally distributed to all the flows or queues $38_{1,1}$–$38_{1,x}$.

The minimum or guaranteed bandwidth provisioned to each flow 38 is determined by the provisioned "sub-channel" or class bandwidth and the number of flows associated with each class 36. For example, if class i has been allocated with $M_i$ flows 38, then the guaranteed bandwidth provisioned to each flow 38 in class i is provided by:

$$F_i = \frac{Q}{\sum_{M_i} Q} \times B_i = \frac{1}{M_i} \times B_i \quad (2)$$

Applying/using equations (1) and (2) can help to guarantee the minimum bandwidth to each class 36, and also to each flow or queue 38 that is associated with the class 36. The DRR algorithm, however, may not provide rate limiting of the flows 38 for some applications/requirements. If the system is not fully provisioned (i.e., the provisioned guaranteed bandwidths to flows have not reached the total bandwidth of the system) or some of the queues 38 in the system are not backlogged (empty queues), then the resulting excessive bandwidth will be redistributed. The excess will be distributed proportionally across all the classes 36 (or at least all classes 36 where there is no excess bandwidth) according to their weights and then equally distributed (assuming equal weights) among all the backlogged queues 38 associated with each class 36.

For example, if class i has been provisioned with $M_i$ flows $38_{i,1}$–$38_{i,M_i}$ but only $M_i'$ (<$M_i$) flows $38_{i,1}$–$38_{i,m'i}$ are backlogged (i.e., have at least a packet queued), then the bandwidth for each backlogged queue $38_{i,1}$–$38_{i,M'i}$ becomes:

$$F_i' = \frac{Q}{\sum_{M_i'} Q} \times B_i = \frac{1}{M_i'} \times B_i > \frac{1}{M_i} \times B_i = F_i \quad (3)$$

If only one flow 38 in a class 36 has packets, then that flow 38 will have the bandwidth $B_i$ of the entire class 36.

The same insufficient rate-limiting may also occur at class level. If some of the classes 36 do not have backlogged queues 38, then the excessive bandwidth will be re-distributed proportionally among the classes 36 with backlogged queues 38. Each backlogged queue 38 will get its share of the excessive bandwidth. In the extreme case, a single flow 38 might have the entire channel bandwidth $B_c$.

Thus, the DRR algorithm provides no mechanism to limit the maximum bandwidth each flow 38 receives when excessive bandwidth is available. This allows, and might result in, bursts of packets 40 into the channel 34 (FIG. 1). The per-flow queuing with hierarchical DRR scheduling does not provide one of the most important service provisioning mechanisms—rate limiting.

Figure 3:
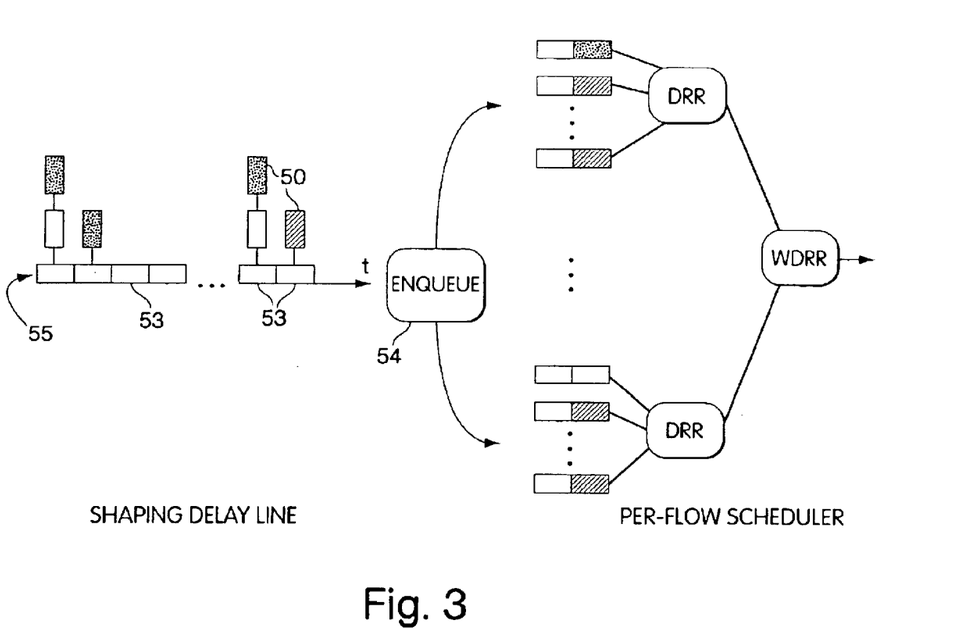
FIG. 3 is a schematic block diagram of prior art data shaping and scheduling of flows in a packet-based network.

Rate limiting on a per-flow basis can be implemented using a separate queuing data structure and algorithm before the packets reach the per-flow queuing and scheduling. This structure and algorithm is called per-flow shaping and is shown in FIG. 3.

With per-flow shaping, some form of leaky bucket algorithm is performed with packets 50 from each flow 52 being inserted into appropriate time slots or bins 53 of a delay line 55. A process operates on the delay line 55 and moves packets 50 that meet one or more specific delay requirements to the corresponding (according to a flow classification of packets) per-flow queue 52 for scheduling. This approach provides separation between shaping and scheduling. Those packets 50 that violate maximum rate or burstness are shaped (delayed) properly before they reach the per-flow queue 52 for scheduling. Thus, a hierarchical DRR scheduling algorithm can be used for a packet scheduling session without worry about violating a maximum rate requirement. This approach, however, invokes design complexity and requires significant processing power, especially when the algorithm is to be implemented in software with a Real-Time Operating System (RTOS).

A problem may result when a large number of packets 50 happen to be put into the same delay time bin. When it is time for an enqueue process 54 to remove the packets from the delay bin 53 to the proper per-flow queues 52, the process 54 might not have enough time to move all the packets 50 to their proper queues 52 in time, thus causing unnecessary delay jitter.

Embodiments of the invention use a single per-flow queuing structure to provide a framework for unified scheduling and rate limiting on a per-flow basis. If a proper algorithm can be included in the per-flow scheduling algorithm, e.g., of the gateway 22, then the scheduler 32 can perform integrated fair-scheduling and rate-limiting. Embodiments of the invention provide an integrated rate-limiting and scheduling algorithm.

Figure 4:
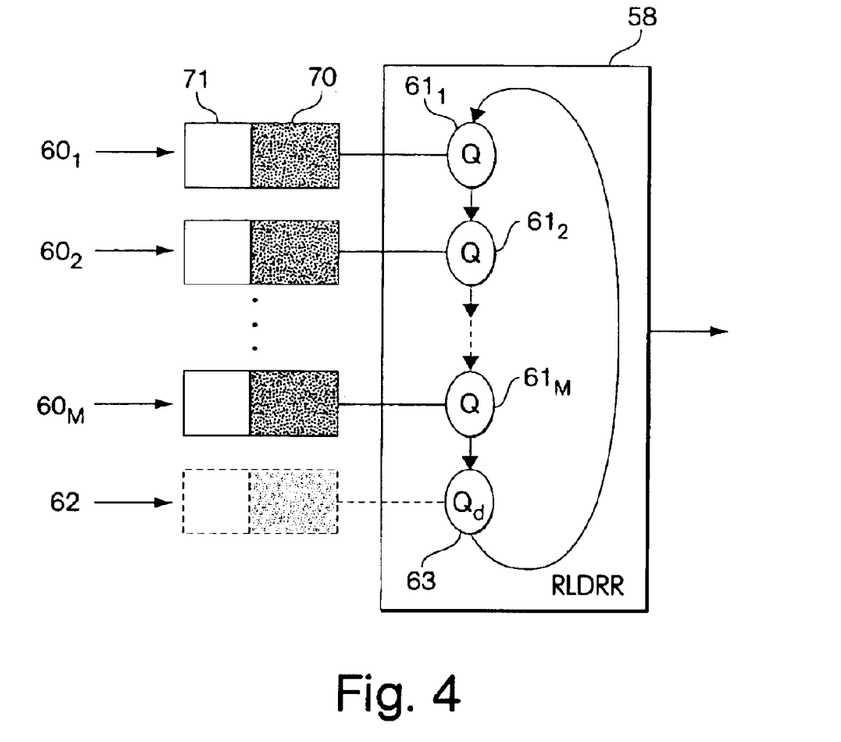
FIG. 4 is a schematic block diagram of rate-limiting data scheduling of flows using a dummy queue, according to an embodiment of the invention, in a packet-based network.

According to the invention, for hierarchical queuing and scheduling, the channel bandwidth $B_c$ is partitioned at the class level for groups of per-flow queues. For example, referring to FIG. 4, consider a particular class 58 with bandwidth $B_{total}$, that has M core queues $60_1$–$60_M$, with associated quanta 61, of the same minimum bandwidth $B_{min}$ and maximum bandwidth $B_{max}$ requirements. The queues 60 may include packets 70 and empty portions 71 as shown. With DRR running for scheduling the queues, a condition that satisfies the minimum bandwidth requirement is:

$$\frac{Q}{\sum_M Q} \times B_{total} = \frac{1}{M} \times B_{total} \geq B_{min} \qquad (4)$$

Referring also to FIG. 1, the scheduler 32 employs a Rate-Limiting Deficit Round Robin (RLDRR) algorithm and a dummy "queue" 62, with associated quantum 63, is included that is always in a "backlogged" state (that would indicate a non-empty queue). The RLDRR algorithm assigns certain quantum (a measure related to bandwidth) to the dummy queue 62 according to a rate-limiting algorithm. When the DRR algorithm schedules the dummy queue 62, transmitting from the dummy queue 62 makes the channel idle for the period of time that consumes the quantum.

The RLDRR algorithm calculates the quantum for the dummy queue 62 at a queuing state change time, that is a transition time when a core queue 60 becomes backlogged or becomes non-backlogged. The calculation is based on the following algorithm.

When all M core queues 60 of the class 58 are backlogged, the bandwidth allocated to each core queue 60 is the minimum bandwidth (i.e., the greater-than-or-equal sign is an equals sign in equation (4)), assuming $M^*B_{min} = B_{total}$, and the algorithm assigns zero (0) quantum to the dummy queue 62 ($Q_d=0$). In this case, each of the M queues 60 will receive its minimum (or guaranteed) bandwidth, that is:

$$\frac{Q}{\sum_M Q} \times B_{total} = \frac{1}{M} \times B_{total} = B_{min} \qquad (5)$$

Assuming that after a queuing state change time there are M'<M core queues 60 backlogged, the algorithm runs as follows:

$$If (1/M')^*B_{total} <= B_{max}\ Q_d = 0 \qquad (6)$$

Else $$Q_d = Q^*(B_{total}/B_{max} - M') \qquad (7)$$

Endif

Thus, when the number M' of backlogged core queues 60 is such that each backlogged queue 60 will receive no more than the maximum allowable bandwidth for the queue 60 (i.e., $(1/M')^*B_{total} <= B_{max}$), then the quantum $Q_d$ of the dummy queue 62 is set to 0. This provides each backlogged queue 60 with bandwidth according to:

$$B_{min} \leq \frac{Q}{\sum_{M'} Q} \times B_{total} = \frac{1}{M'} \times B_{total} \leq \frac{B_{max}}{B_{total}} \times B_{total} = B_{max} \qquad (8)$$

If the number M' of backlogged queues 60 is such that $(1/M')^*B_{total} > B_{max}$, then $Q_d$ is set to $Q^*(B_{total}/B_{max}-M')$ to provide each backlogged queue 60 with bandwidth according to:

$$B_{min} \leq \frac{Q}{Q_d + \sum_{M'} Q} \times B_{total} = \qquad (9)$$

$$\frac{Q}{Q \times (B_{total}/B_{max} - M') + M' \times Q} \times B_{total} = B_{max}$$

The dummy queue 62 thus is assigned a quantum to absorb a portion of the total bandwidth B such that when the available bandwidth for the backlogged non-dummy queues 60 is allocated to these non-dummy queues 60, the maximum bandwidth for any non-dummy queues 60 will not be exceeded. By adjusting the quantum of the dummy queue together with the DRR algorithm, the RLDRR algorithm helps to guarantee the minimum guaranteed bandwidth for each queue 60 when the traffic is heavy (equation (5)), and to limit (enforce) the maximum allowed (or contracted) per-flow rate for each queue 60 when the traffic is light (equations (8)–(9)). Since the calculation required for the RLDRR dummy queue quantum update is relatively simple, it is relatively easy to implement the algorithm in hardware and/or software in, e.g., the gateway 22.

Figure 5:
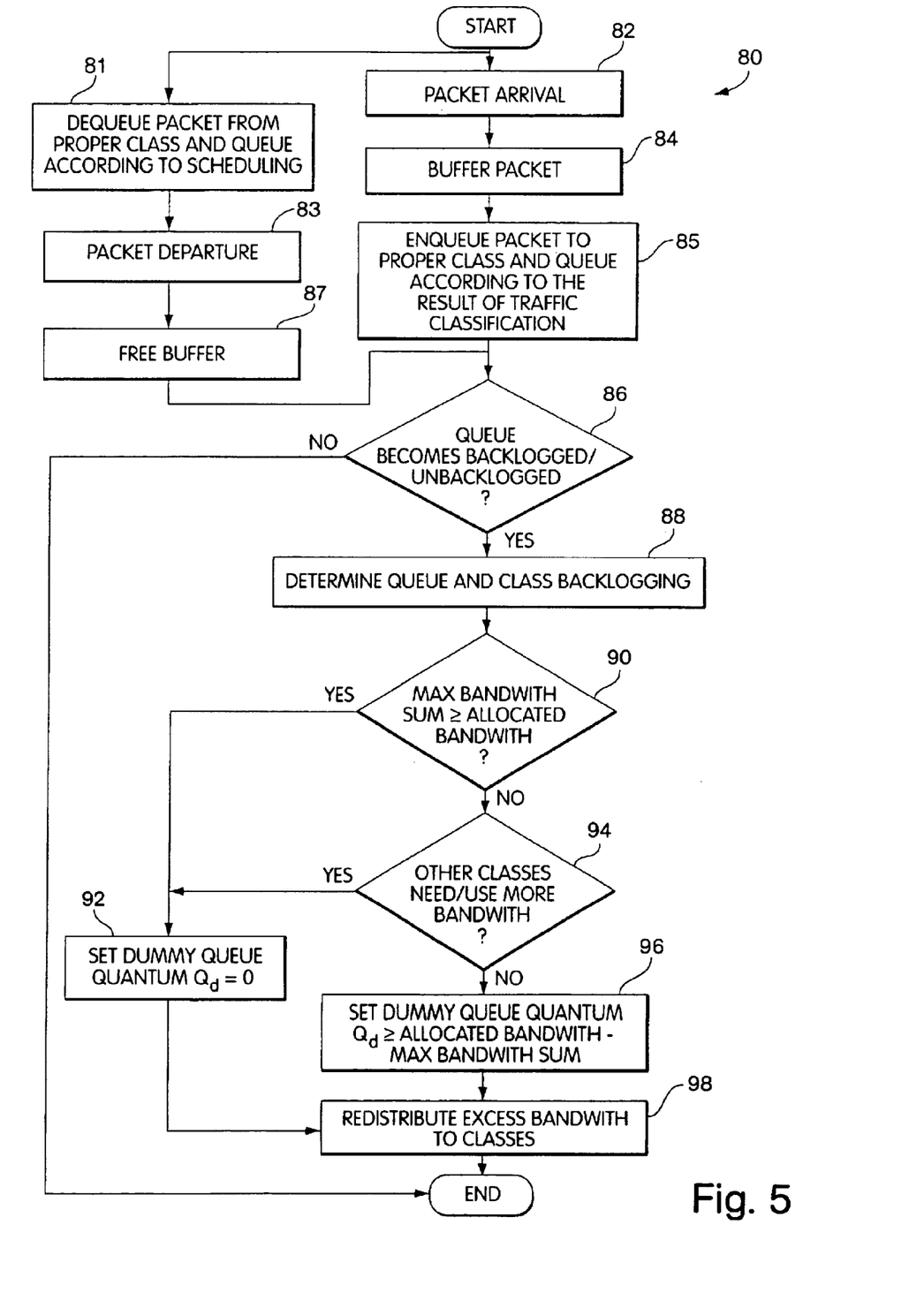
FIG. 5 is a block diagram of a process of data scheduling on a per-flow basis using a dummy queue as shown in FIG. 4 for rate limiting of data transfer.

Referring to FIG. 5, with further reference to FIGS. 1 and 4, a process 80 of dummy-queue quantum adjustment includes the following stages. Stages may be added to, removed from, or rearranged in, the process 80 without departing from the invention. Thus, the process 80 shown in FIG. 5 and described below is exemplary only, and not limiting.

At stage 82, packets 70 of data in queues 60 are sent by the computers 16, 18 to the gateway 22. The gateway 22 receives the packets at its input ports and routed to the storage device 30.

At stage 84, the received packets 70 are stored in the memory 30. The packets 70 are stored in queues 60 and at least one class 58 of queues for transfer out of the gateway 22 according to bandwidth to be allocated to the queues 60 from the total available bandwidth of the channel 34.

At stage 85, the arrival packet is put into the proper queue 60 according to the result of traffic classification based on packet header information (e.g., destination address, source address, protocol, etc.).

Stages 81, 83, and 87 show actions for when a packet leaves a queue. At stage 81, a packet is dequeued from the proper class and packets are queued according to appropriate scheduling rules. At stage 83, the packet leaves its queue 60. At stage 87, the buffer memory 30 is freed of the packet.

At stage 86, the controller 32 determines whether a queue 60 becomes backlogged (from empty to non-empty) because of packet arrival, or becomes unbacklogged (from non-empty to empty) due to packet departure. If the queue 60 becomes backlogged or unbacklogged, the controller 32 will proceed with the possible dummy-queue quantum adjustment. Otherwise, no dummy-queue quantum adjustment is performed.

At stage 88, the controller 32 determines backlogging of packets and allocates class bandwidths. The controller 32 determines which and how many, if any, classes 58 of queues 60 have backlogged queues 60. The controller 32 initially allocates the channel bandwidth $B_c$ to the classes 58 according to their respective weights, e.g., with class $58_i$ receiving bandwidth $B_i$. The controller 32 further determines which and how many queues 60 are backlogged within each backlogged class, e.g., the class $58_i$.

At stage 90 the controller 32 inquires as to whether the cumulative maximum bandwidth $S_i$ for the queues 60 in the class $58_i$ exceeds the allocated bandwidth $B_i$ of the class $58_i$. The controller 32 compares the sum $S_i$ of the maximum bandwidths of all the backlogged queues 60 against the bandwidth $B_i$ allocated to the corresponding class $58_i$. If the maximum cumulative bandwidth $S_i$ equals or exceeds the allocated bandwidth $B_i$, then at stage 92 the controller 32 sets the bandwidth quantum 63 for the dummy queue 62 to zero and the process 80 proceeds to stage 98. If the maximum cumulative bandwidth $S_i$ is exceeded by the allocated bandwidth $B_i$, then the process 80 proceeds to stage 94.

At stage 94 the controller 32 determines whether other classes 58 need, or at least could use, more bandwidth. The controller 32 checks other classes 58, and in particular classes 58 where the dummy bandwidth quantum 63 is set to zero, and inquires whether the maximum cumulative bandwidth of the class 58 has been allocated to that class 58. If at least one other class 58 could use more bandwidth, then the controller 32 assigns the excess bandwidth of class $58_i$ to the other class(es) 58 according to their weights, and the process 80 proceeds to stage 92 where the dummy bandwidth quantum 63 of the class in question $58_i$, is set to zero. If the controller 32 determines not to provide excess bandwidth from class $58_i$ to any other class 58, then the process 80 proceeds to stage 96.

At stage 96 the controller 32 sets the bandwidth quantum 63 for the dummy queue 62 to consume at least the excessive bandwidth. Preferably, the dummy quantum 63 is set so that the dummy bandwidth equals the excess bandwidth (the difference between the sum $S_i$ and the allocated bandwidth $B_i$). Here, the controller 32 sets the quantum 63 of the dummy queue 62 according to equation (7). The process proceeds to stage 98.

At stage 98, the excess bandwidth, if any, from the classes 58 is redistributed to other appropriate classes by the controller 32. The controller 32 determines which classes, if any, have excess bandwidth and how much (which may have been done at stage 94). This excess bandwidth is provided by the controller 32 to the classes 58 where the dummy quanta are set to zero in accordance with relative weights of these classes 58. The quanta 63 of the dummy queues 62 of one or more classes 58 are reset by the controller 32 as appropriate such that any excess bandwidth above the maximum cumulative bandwidth S for any class 58 is consumed by the dummy queue 62 of that class 58. The bandwidths for all the classes 58 and queues 60 in those classes are set. The controller 32 allocates the bandwidths in accordance with stages 88, 90, 92, 94, and 96 to all the queues 60 and classes 58, including to all dummy queues 62, in accordance with the quanta of the classes 58 and the quanta 61, 63 of the queues 60.

Other embodiments are within the scope and spirit of the appended claims. For example, class-level rate limiting can be employed. In this case, e.g., at stage 88 of the process 80, the controller 32 could inquire as to whether the initial bandwidths allocated to the classes 58 exceed cumulative maximum bandwidths of the backlogged classes 58. If so, then a dummy class can be allocated excess class bandwidth. Excess queue bandwidth would not be redistributed as long as the class-level dummy quantum was non-zero.

What is claimed is:

1. A packetized-data processing apparatus comprising:
a memory configured to store core groups of packetized data;
a channel coupled to the memory and having a total bandwidth for transferring packets of data from the core groups; and
a scheduler operatively coupled to the memory and the channel and configured to allocate amounts of the total bandwidth of the channel to each of the core groups that is backlogged, while limiting the amount of allocated bandwidth, and a corresponding transfer rate of packets of data, for each core group to a maximum allowable bandwidth for each core group, to schedule transfer of packetized data of the core groups from the memory to the channel in accordance with the respective amounts of allocated bandwidth for the core groups;
wherein the scheduler is configured to allocate channel bandwidth to a dummy group.

2. The apparatus of claim 1 wherein the channel bandwidth allocated to the dummy group is dependent upon an amount of backlogged core groups.

3. The apparatus of claim 2 wherein the dummy group is allocated zero bandwidth if all core groups are backlogged.

4. The apparatus of claim 2 wherein the channel bandwidth allocated to the dummy group is also dependent upon weightings of bandwidth allocation associated with the core groups and upon at least one maximum allowable bandwidth associated with at least one of the core groups.

5. The apparatus of claim 4 wherein the dummy group is allocated zero bandwidth if the total channel bandwidth is allocatable to only core backlogged groups in accordance with their relative bandwidth weightings without exceeding their respective maximum allowable bandwidths.

6. The apparatus of claim 4 wherein the dummy group is allocated at least an amount of the total channel bandwidth equaling a sum of the respective maximum allowable bandwidths of backlogged core groups.

7. The apparatus of claim 6 wherein the dummy group is allocated bandwidth according to $Q(B_{total}/B_{max}-M')$, where $B_{total}$ is the total channel bandwidth, $B_{max}$ is the maximum allowable bandwidth for each of the core groups, M' is the amount of backlogged core groups, and Q is a weighting of core groups.

8. The apparatus of claim 1 wherein the scheduler is configured to determine an amount of bandwidth to allocate to the dummy group each time a backlog state of a core group changes.

9. The apparatus of claim 1 wherein the core groups are classes of queues of packets of data.

10. The apparatus of claim 1 wherein the core groups are queues of packets of data.

11. A computer program product, for use with a communications channel having a total bandwidth and a memory for storing core groups of packets of data, the computer program product comprising instructions for causing a computer to:
obtain an indication of an amount of backlogged core groups;

allocate first portions of the total bandwidth of the channel to a plurality of backlogged core groups according to weights associated with each backlogged core group; and allocate a second portion of the total bandwidth of the channel to a dummy group, the second portion being at least as large as an amount of the total bandwidth that exceeds a cumulative bandwidth of maximum bandwidths associated with the plurality of backlogged core groups.

12. The computer program product of claim 11 wherein the instructions for causing a computer to allocate bandwidth cause the computer to allocate bandwidth in response to a core group changing backlogged state.

13. The computer program product of claim 11 wherein the second portion is zero bandwidth if the total channel bandwidth is allocatable to only core backlogged groups in accordance with their relative bandwidth weights without exceeding respective maximum allowable bandwidths of the core backlogged groups.

14. The computer program product of claim 11 wherein the second portion is dependent upon at least one maximum allowable bandwidth associated with at least one of the core groups.

15. The computer program product of claim 11 wherein the second portion is $Q(B_{total}/B_{max}-M')$, where $B_{total}$ is the total channel bandwidth, $B_{max}$ is a maximum allowable bandwidth for each of the core groups, M' is an amount of backlogged core groups, and Q is a weighting of core groups.

16. A method of transferring data packets from a plurality of groups for storing packets of data and a transmission channel having a total bandwidth, the method comprising:

obtaining an indication of an amount of backlogged groups from among the plurality of groups;

allocating first portions of the total bandwidth of the channel to a plurality of backlogged groups according to weights associated with each backlogged group; and allocating a second portion of the total bandwidth of the channel to be unused, the second portion being at least as large as an amount of the total bandwidth that exceeds a cumulative bandwidth of maximum bandwidths associated with the plurality of backlogged groups.

17. The method of claim 16 wherein the allocating of the first portions and the second portion occur in response to a group changing backlogged state.

18. The method of claim 16 wherein the second portion is zero bandwidth if the total channel bandwidth is allocatable to only backlogged groups in accordance with their relative bandwidth weights without exceeding respective maximum allowable bandwidths of the backlogged groups.

19. The method of claim 16 wherein the second portion is dependent upon at least one maximum allowable bandwidth associated with at least one of the groups.

20. The method of claim 16 wherein the second portion is $Q(B_{total}/B_{max}-M')$, where $B_{total}$ is the total channel bandwidth, $B_{max}$ is a maximum allowable bandwidth for each of the groups, M' is an amount of backlogged groups, and Q is a weighting of groups.

21. A system for transferring packets of data, the system comprising:

at least one input port configured to receive packets of data;

a storage device coupled to the at least one input port and configured to store groups of packets of data received at the at least one input port;

at least one output port coupled to the storage device and configured to transmit packets of data stored in the storage device; and control means for controlling amounts of bandwidth of the output port provided for each of the groups for transferring the packets of data via the output port, the amount of bandwidth provided for each group varying with a number of groups containing packets of data and being limited to a maximum amount of bandwidth associated with each group;

wherein the control means controls the amounts of bandwidth of each group by applying a weighted deficit round robin algorithm, said weighted deficit round robin algorithm includes a dummy queue for which the control means provides bandwidth to limit rates at which packets of data are transferred from the groups.

* * * * *